(12) United States Patent
Wang et al.

(10) Patent No.: US 12,327,955 B2
(45) Date of Patent: Jun. 10, 2025

(54) PARAMETER CONFIGURATION DEVICE

(71) Applicant: Gree Electric Appliances, Inc. of Zhuhai, Guangdong (CN)

(72) Inventors: Jing Wang, Guangdong (CN); Meng Huang, Guangdong (CN); Zhenwei Chen, Guangdong (CN); Mingqiang Sheng, Guangdong (CN); Shangxian Feng, Guangdong (CN); Xianqiao Yu, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 379 days.

(21) Appl. No.: 18/009,828

(22) PCT Filed: Jul. 12, 2021

(86) PCT No.: PCT/CN2021/105767
§ 371 (c)(1),
(2) Date: Dec. 12, 2022

(87) PCT Pub. No.: WO2022/042086
PCT Pub. Date: Mar. 3, 2022

(65) Prior Publication Data
US 2023/0246399 A1    Aug. 3, 2023

(30) Foreign Application Priority Data
Aug. 26, 2020   (CN) .......................... 202010870339.2

(51) Int. Cl.
*H01R 13/66* (2006.01)
*H01R 13/502* (2006.01)
(Continued)

(52) U.S. Cl.
CPC ......... *H01R 13/665* (2013.01); *H01R 13/502* (2013.01); *H01R 13/629* (2013.01); *H01R 13/639* (2013.01)

(58) Field of Classification Search
CPC ... H01R 13/665; H01R 13/502; H01R 13/629
See application file for complete search history.

(56) References Cited

U.S. PATENT DOCUMENTS

| 6,232,557 | B1 | 5/2001 | Lounsbury et al. |
| 2007/0004282 | A1 | 1/2007 | Cohen et al. |

(Continued)

FOREIGN PATENT DOCUMENTS

| CN | 101501793 A | 8/2009 |
| CN | 102025053 A | 4/2011 |

(Continued)

*Primary Examiner* — David Bilodeau
(74) *Attorney, Agent, or Firm* — The Webb Law Firm

(57) ABSTRACT

The present disclosure provides a parameter configuration device, including a first signal modulator, a second signal modulator and an operating member electrically connected with the first signal modulator or the second signal modulator. The first signal modulator and the second signal modulator have a connection state and a separated state. In the connection state, the first signal modulating element is electrically connected with the second signal modulating element, and the first signal modulating element and the second signal modulating element enclose a configuration space for a cable to pass through. In the separated state, the first signal modulator is separated from the second signal modulator. The embodiments of the present disclosure make it easier to perform the operation of parameter configuration with a low cost.

16 Claims, 2 Drawing Sheets

(51) Int. Cl.
*H01R 13/629* (2006.01)
*H01R 13/639* (2006.01)

(56) References Cited

U.S. PATENT DOCUMENTS

| | | | |
|---|---|---|---|
| 2011/0065328 A1 | 3/2011 | Wu | |
| 2013/0325191 A1* | 12/2013 | Mukai | F24F 11/63 |
| | | | 700/276 |
| 2016/0105735 A1* | 4/2016 | Louzir | G01R 21/133 |
| | | | 340/870.02 |

FOREIGN PATENT DOCUMENTS

| | | |
|---|---|---|
| CN | 104883770 A | 9/2015 |
| CN | 110749043 A | 2/2020 |
| CN | 111884682 A | 11/2020 |
| CN | 212367270 U | 1/2021 |
| EP | 3093556 A1 | 11/2016 |
| JP | 2019066337 A | 4/2019 |
| KR | 101389573 B1 | 5/2014 |
| WO | 2008033527 A2 | 3/2008 |

* cited by examiner

PARAMETER CONFIGURATION DEVICE

CROSS-REFERENCE TO RELATED APPLICATIONS

This application is the United States national phase of International Patent Application No. PCT/CN2021/105767 filed Jul. 12, 2021, and claims priority to Chinese Patent Application No. 202010870339.2 filed Aug. 26, 2020, the disclosures of which are hereby incorporated by reference in their entireties.

BACKGROUND OF THE INVENTION

Field of the Invention

The present disclosure relates to the technical field of a circuit device, and in particular, to a parameter configuration device.

Description of Related Art

Product configuration which is a common operation during the use of a terminal product, mostly appears in scenarios such as first installation, first debugging, and first use. When the air-conditioning system is installed for the first time, system configuration and related debugging operations are required. Further, for the increasingly emerging Energy Internet system which contains photovoltaics, energy storage, converters, DC appliances and interactive interfaces with power grid, when the entire system is installed for the first time, it is also necessary to configure and debug the parameters in aspects of each section, such as capacity, operation mode, power grid standard, certification standards and grid-connection requirements.

Taking the photovoltaic air-conditioning system as an example, after the first installation, it is necessary to perform parameter configuration through the dial buttons of the main control controller and the digital display tube. In this operation, it is necessary to first remove the metal plate panel of the air-conditioning unit, and then remove the cover plate of the electrical box inside the air-conditioning unit. After power-on, configuration work is performed on a row of mechanical buttons integrated on the controller according to a display state of the digital tube, relevant debugging is performed after completed configuration, and a normal operation state is entered. There are also other configuration methods for related technologies in the industry, for example phone APP configuration, voice configuration, and network remote configuration.

SUMMARY OF THE INVENTION

It is found through studies that, parameter configuration work through the dial buttons of the main control controller and the digital display tube involves a relatively complicated operation process, and the entire configuration process appears to be more difficult for unfamiliar after-sales operators. If the configuration parameters needs to be temporarily changed during the operation process of the entire system or air-conditioning unit, it is necessary that the relevant operators perform re-configuration according to the above steps, which may increase a number of additional investments in human resources, thereby increasing related expenditures. Other configuration methods existing in the industry which have high requirements for the network or device, are present with the problem of a high configuration cost.

In view of this, the present disclosure provides a parameter configuration device that is convenient in operation, and simple in configuration with a low cost, which can overcome the defects of difficult operation and high configuration cost in the parameter configuration product of the related art.

In one aspect of the present disclosure, a parameter configuration device is provided. The device includes: a first signal modulator; a second signal modulator; and an operating member electrically connected with the first signal modulator or the second signal modulator, wherein the operating member is configured to output a configuration signal current, wherein the first signal modulator and the second signal modulator have a connection state and a separated state, such that when the first signal modulator and the second signal modulator are in the connection state, the first signal modulating element is electrically connected with the second signal modulating element, and the first signal modulating element and the second signal modulating element enclose a configuration space for a cable to pass through; and when the first signal modulating element and the second signal modulator are in the separated state, the first signal modulator is separated from the second signal modulator.

In some embodiments, the parameter configuration device further includes: an insulating housing including a first part and a second part, wherein a first end of the first part is rotatably connected with a first end of the second part, and a second end of the first part is detachably connected to a second end of the second part, the first part and the second part enclose an assembling space, the first signal modulator and the second signal modulator are both arranged within the assembling space, the first signal modulator is arranged on the first part, and the second signal modulator is arranged on the second part.

In some embodiments, the parameter configuration device further includes: a first elastic member and a second elastic member, wherein the first elastic member and the second elastic member are both of a conductive material, wherein when the first signal modulator and the second signal modulator are in the connection state, the first signal modulator and the second signal modulator are arranged at intervals, the first elastic member is arranged between one side of the first signal modulator and one side of the second signal modulator, the first elastic member is in contact with the first signal modulator and the second signal modulator respectively, the second elastic member is arranged between the other side of the first signal modulator and the other side of the second signal modulator, the second elastic member is in contact with the first signal modulator and the second signal modulator respectively.

In some embodiments, the insulating housing further includes: a connector located between the first end of the first part and the first end of the second part, wherein both sides of the connector are rotatably connected with the first end of the first part and the first end of the second part respectively, and a thickness of the connector is smaller than a thickness of the first part and a thickness of the second part.

In some embodiments, the first elastic member and the second elastic member are both of conductive rubber.

In some embodiments, the operating member is arranged outside the insulating housing, and the operating member is detachably connected to the insulating housing.

In some embodiments, the insulating housing has at least two latches, and the operating member has slots corresponding to the latches.

In some embodiments, the parameter configuration device further includes: a third elastic member made of a conductive material, wherein the third elastic member is arranged between two of the at least two latches, wherein when the latch is inserted into the slot, the third elastic member is in a compressed state, one end of the third elastic member is configured to be in contact with and electrically connected with the operating member, and the other end of the third elastic member passes through the insulating housing and is electrically connected with the first signal modulator or the second signal modulator.

In some embodiments, one end of the slot extends to a side of the operating member to form a sliding exit.

In some embodiments, the first signal modulator is detachably connected to the first part.

In some embodiments, the first signal modulator has a first matching portion, the first part has a second matching portion, one of the first matching portion and the second matching portion is a positioning latch, and the other is a positioning slot, and the positioning latch is clamped with the positioning slot.

In some embodiments, the numbers of the first matching portion and the second matching portion are both at least two, and the first matching portion corresponds to the second matching portion, wherein two first matching portions are arranged on both end surfaces of the first signal modulator respectively.

In some embodiments, a second end of the first part has a first latch body, a second end of the second part has a second latch body, the first latch body has a limiting slot, and the second latch body latches into the limiting slot.

In some embodiments, one end of the first signal modulator is detachably connected to one end of the second signal modulator, and the other end of the first signal modulator is detachably connected to the other end of the second signal modulator.

In some embodiments, when the first signal modulator and the second signal modulator are in the connection state, the first signal modulator and the second signal modulator cooperate to form a tubular structure.

In some embodiments, the operating member has a plurality of buttons.

According to an embodiment of the present disclosure, when the parameter configuration device needs to perform parameter configuration on the terminal, the first signal modulator may be electrically connected with the second signal modulator to enclose the configuration space outside the power supply cable of the terminal, and the configuration space is sleeved outside the power supply cable. When the operating member outputs a configuration signal current, the first signal modulator and the second signal modulator can receive the configuration signal current, and the structure in which the first signal modulator is matched with the second signal modulator may directly load the configuration information on a strong electric signal of the power supply cable of the terminal through the power line carrier technology, and transmit the superimposed modulation signal to the terminal by way of flow of the strong electric current and the voltage, thereby implementing parameter configuration of the terminal. After completed configuration, the first signal modulator is separated from the second signal modulator, so that the cable is detached from the configuration space. Thus, the above-described parameter configuration device cam perform parameter configuration outside the terminal by cooperating with the power supply cable without removing the housing of the terminal, so that the operation is easier. The control member may directly output a configuration signal current for parameter configuration of the terminal, which has low requirements for the network and device and a low configuration cost.

BRIEF DESCRIPTION OF THE DRAWINGS

The accompanying drawings that constitute part of the present application, are intended to provide a further understanding of the present disclosure. The illustrative embodiments of the present disclosure as well as the illustrations thereof for explaining the present disclosure, do not constitute improper definitions on the present disclosure.

In order to more explicitly explain the technical solutions in the embodiments of the present disclosure, a brief introduction will be given below for the accompanying drawings required to be used in illustrating the embodiments. It is obvious that, the accompanying drawings illustrated below are merely some of the embodiments of the present disclosure. For those of ordinary skill in the art, other accompanying drawings may also be obtained according to these accompanying drawings on the premise that no inventive effort is involved.

DESCRIPTION OF REFERENCE NUMERALS

100. first signal modulator; 101. configuration space; 110. first matching portion; 200. second signal modulator; 300. operating member; 301. slot; 310. button; 320. display member; 400. insulation housing; 401. latch; 410. first part; 411. second matching portion; 412. first latch body; 420. second part; 421. second latch body; 430. connector; 510. first elastic member. 520. second elastic member; 530. third elastic member.

DESCRIPTION OF THE INVENTION

In order to make the above-described object, features and advantages of the present disclosure more apparent and understandable, detailed explanations will be made below to the specific embodiments of the present invention in conjunction with the accompanying drawings. In the following illustrations, many specific details are elaborated in order to facilitate an adequate understanding of the present disclosure. However, the present disclosure can be implemented in many other manners different from those illustrated here, and those skilled in the art may make similar improvements without departing from the intension of the present disclosure. Therefore, the present disclosure is not limited by the specific embodiments disclosed below.

Figure 1:
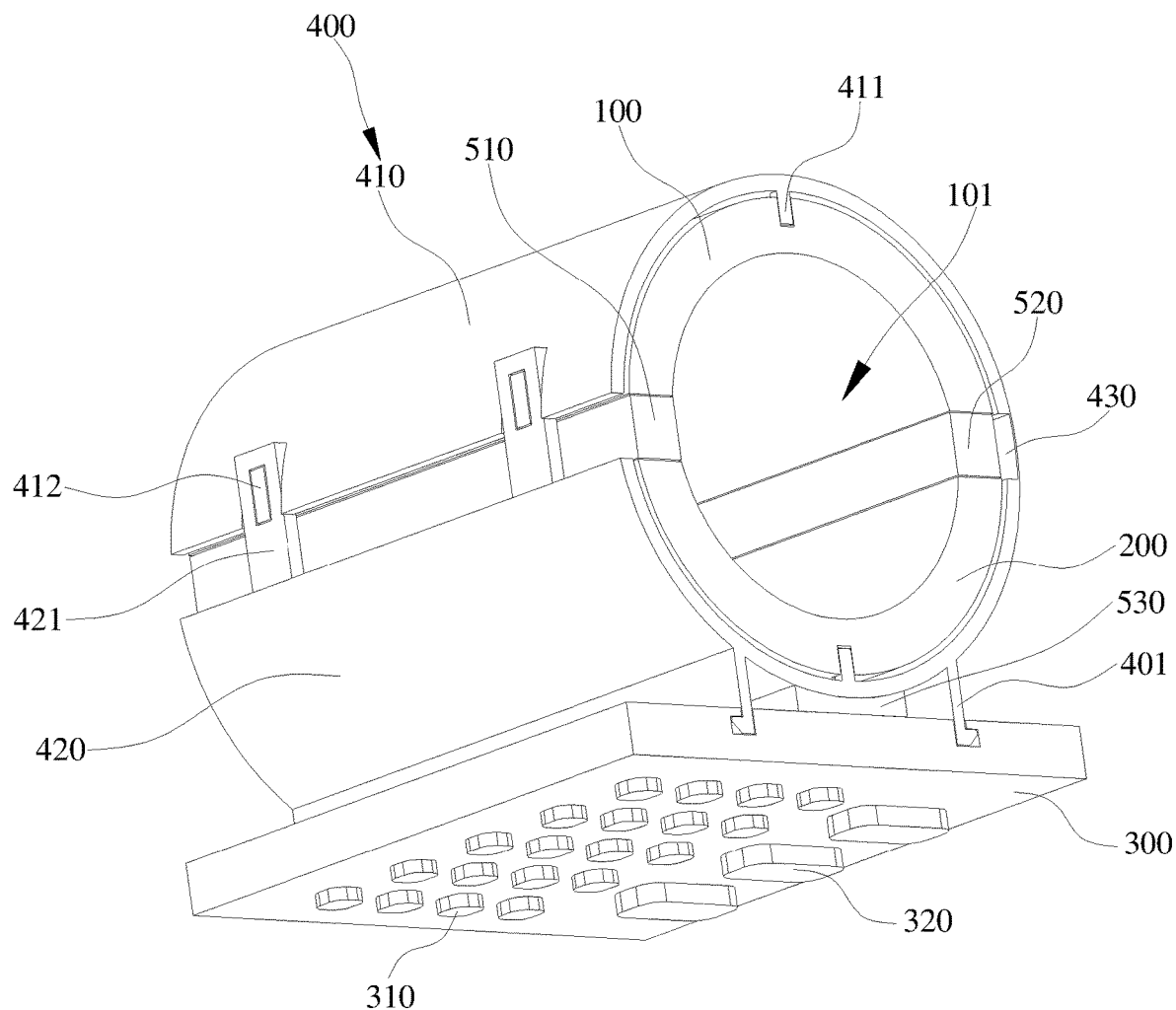
FIG. 1 is a schematic structural view of a parameter configuration device according to an embodiment of the present disclosure.
Figure 2:
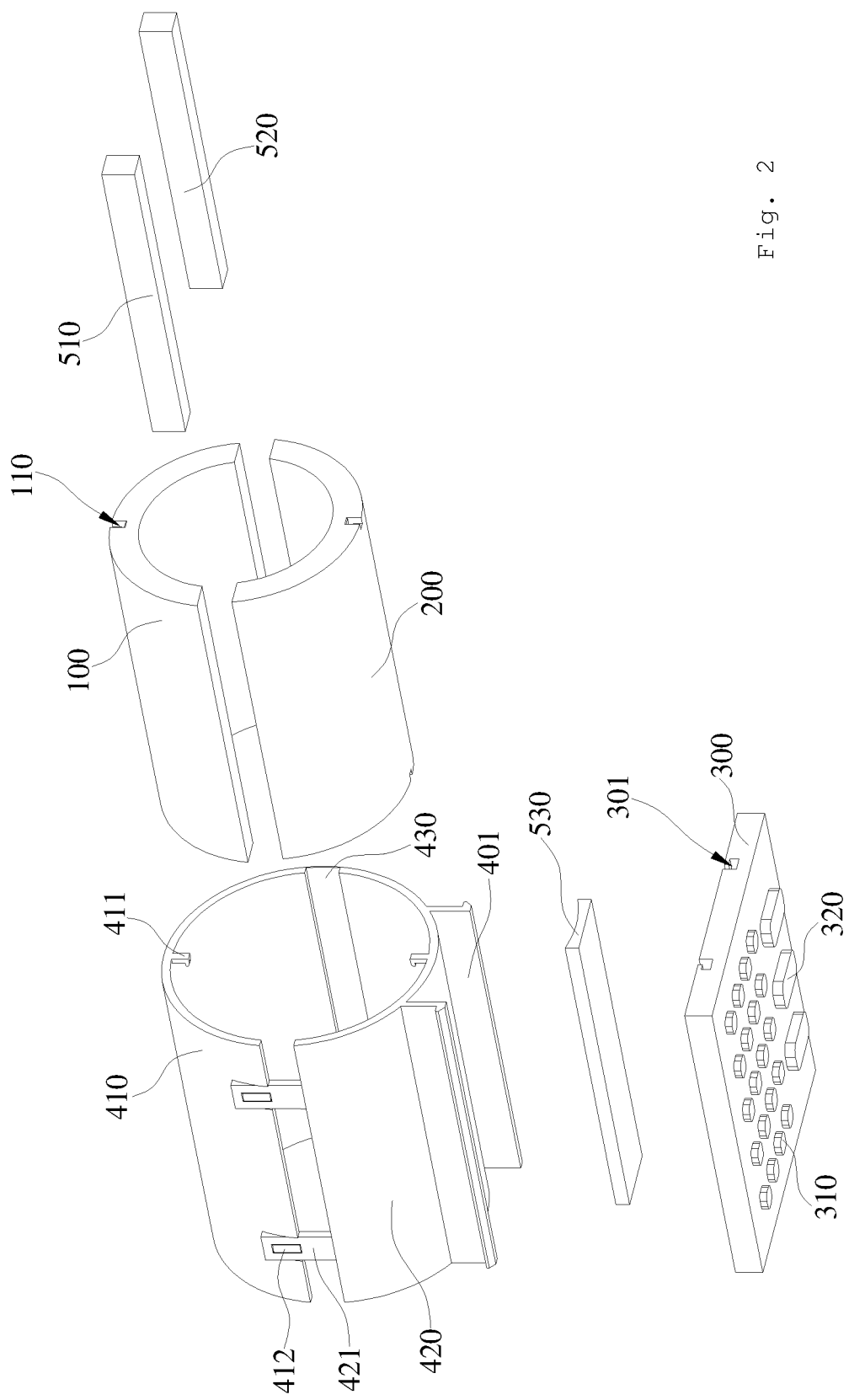
FIG. 2 is an exploded schematic view of a parameter configuration device according to an embodiment of the present disclosure.

As shown in FIGS. 1 and 2, in one embodiment, a parameter configuration device is disclosed. The device includes a first signal modulator 100, a second signal modulator 200 and an operating member 300. The operating member 300 is electrically connected with the first signal modulator 100 or the second signal modulator 200, the operating member 300 is configured to output a configuration signal current, and the first signal modulator 100 and the second signal modulator 200 have a connection state and a separated state. When the first signal modulator 100 and the second signal modulator 200 are in a connection state, the first signal modulator 100 is electrically connected with the second signal modulator 200, and the first signal modulator 100 and the second signal modulator 200 enclose a configuration space 101 for a cable to pass through. When the first signal modulator 100 and the second signal modulator 200 are in a separated state, the first signal modulator 100 is separated from the second signal modulator 200.

In the present embodiment, when the parameter configuration device needs to perform parameter configuration on the terminal, the first signal modulator 100 may be electrically connected with the second signal modulator 200 outside the power supply cable of the terminal to enclose the configuration space 101, which is sleeved outside the power supply cable. When the operating member 300 outputs a configuration signal current, the first signal modulator 100 and the second signal modulator 200 can receive the configuration signal current, and the structure in which the first signal modulator 100 is matched with the second signal modulator 200 may directly load the configuration information on a strong electric signal of the power supply cable of the terminal through the power line carrier technology, and transmit the superimposed modulation signal to the terminal by way of flow of the strong electric current and the voltage, thereby implementing parameter configuration of the terminal. After completed configuration, the first signal modulator 100 is separated from the second signal modulator 200, so that the cable is detached from the configuration space 101. Thus, the above-described parameter configuration device cam perform parameter configuration outside the terminal by cooperating with the power supply cable without removing the housing of the terminal, so that the operation is easier. The control member may directly output a configuration signal current for parameter configuration of the terminal, which has low requirements for the network and device and a low configuration cost.

In some embodiments, the first signal modulator 100 and the second signal modulator 200 both include a conductive material. In other embodiments, the first signal modulator 100 is internally provided with a first circuit, the second signal modulator 200 is internally provided with a second circuit, the outer surface of the first signal modulator 100 is provided with a first contact electrically connected with the first circuit, and the outer surface of the second signal modulator 200 is provided with a second contact electrically connected with the second circuit. When the first signal modulator 100 and the second signal modulator 200 are in a connection state to enclose a configuration space 101, the first contact and the second contact are electrically connected by direct contact or indirect contact.

In some embodiments, the first signal modulator 100 and the second signal modulator 200 may be configured to clamp a cable. In other embodiments, the first signal modulator 100 and the second signal modulator 200 may be clearance-fit with the cable. Specifically, when the first signal modulator 100 and the second signal modulator 200 are configured to clamp a cable, the first signal modulator 100 and the second signal modulator 200 are in a closer distance to a wire within the cable, so that it is possible to better directly load the configuration information on the strong electric signal of the power supply cable through the power line carrier technology without information loss due to a long distance.

In some embodiments, the first signal modulator 100 and/or the second signal modulator 200 may cause the configuration signal current to affect the strong electric signal within the cable by coupling, thereby implementing parameter configuration of the terminal.

In some embodiments, as shown in FIGS. 1 and 2, the above-described parameter configuration device further includes an insulating housing 400, which includes a first part 410 and a second part 420. The first end of the first part 410 is rotatably connected to the first end of the second part 420, the second end of the first part 410 is detachably connected to the second end of the second part 420, and the first part 410 and the second part 420 enclose an assembling space. The first signal modulator 100 and the second signal modulator 200 are both arranged within the assembling space, the first signal modulator 100 is arranged on the first part 410, and the second signal modulator 200 is arranged on the second part 420. During parameter configuration, the first signal modulator 100 and the second signal modulator 200 may be connected each other by approximating the first part 410 and the second part 420. The insulating housing 400 can insulate the first signal modulator 100 and the second signal modulator 200 within the assembling space, which may prevent circumstances such as electric shock or leakage and ensure the safety of parameter configuration. At the same time, during parameter configuration, the first signal modulator 100 and the second signal modulator 200 may not be affected, so that there is a better configuration effect.

In some embodiments, the length of the first part 410 is greater than or equal to the length of the first signal modulator 100, and the length of the second part 420 is greater than or equal to the length of the second signal modulator 200. At this time, the first part 410 and the second part 420 may comprehensively cover the first signal modulator 100 and the second signal modulator 200, thereby producing a better insulation effect.

In some embodiments, the first part 410 is matched in shape with the first signal modulator 100, and the second part 420 is matched in shape with the second signal modulator 200. For example, the first part 410 and the first signal modulator 100 are both arc-shaped structures, which can make the first part 410 better matched with the first signal modulator 100.

In some embodiments, as shown in FIGS. 1 and 2, the above-described parameter configuration device further includes a first elastic member 510 and a second elastic member 520. The first elastic member 510 and the second elastic member 520 are both made of a conductive material. When the first signal modulator 100 and the second signal modulator 200 are in a connection state, the first signal modulator 100 and the second signal modulator 200 are arranged at intervals, the first elastic member 510 is arranged between one side of the first signal modulator 100 and one side of the second signal modulator 200, the first elastic member 510 is in contact with the first signal modulator 100 and the second signal modulator 200 respectively, the second elastic member 520 is arranged between the other side of the first signal modulator 100 and the other side of the second signal modulator 200, and the second elastic member 520 is in contact with the first signal modulator 100 and the second signal modulator 200 respectively.

The first elastic member 510 and the second elastic member 520 are elastically deformable, so that the first signal modulator 100 and the second signal modulator 200 have certain adjustability on basis of their connection, so that it is possible to match with different sizes of cables. For example, when the cable has a large size, the distance between the first signal modulator 100 and the second signal modulator 200 is relatively long, and the first elastic member 510 and the second elastic member 520 are not stressed so that electrical connection is realized only by contact. When the cable has a small cable, the first signal modulator 100 and the second signal modulator 200 may be closer, and the first elastic member 510 and the second elastic member 520 are deformed by compression, so that the first signal modulator 100 and the second signal modulator 200 remain electrically connected so as to be attached to the cable.

Here, the "one side" and the "the other side" refer to two sides of the first signal modulator 100 and the second signal modulator 200 along the circumferential positions thereof.

In some embodiments, as shown in FIGS. 1 and 2, the insulating housing further includes a connector 430 located between the first end of the first part 410 and the first end of the second part 420. The two sides of the connector 430 are rotatably connected with the first end of the first part 410 and the first end of the second part 420 respectively, and the thickness of the connector 430 is smaller than the thickness of the first part 410 and the thickness of the second part 420. At this time, when the first end of the first part 410 and the second end of the second part 420 are connected with the connector 430, a groove structure may be formed between the first end of the first part 410 and the first end of the second part 420, for placing the first elastic member 510 or the second elastic member 520, which may facilitate placing and positioning the elastic member. The connector 430 is made of an insulating material.

In some embodiments, the connector 430, the first part 410, and the second part 420 have the same material. A bendable configuration is provided between the connector 430 and the first end of the first part 410, and between the connector 430 and the first end of the second part 420, so as to facilitate rotation of the first part 410 and the second part 420 by forming a crease.

In other embodiments, the first end of the first part 410 may also be hinged to the first end of the second part 420.

In some embodiments, the first elastic member 510 and the second elastic member 520 are both of conductive rubber. The conductive rubber which has a favorable electrical conductivity, can be in adequate contact with the first signal modulator 100 and the second signal modulator 200 so as to ensure the effect of electrical connection between the first signal modulator 100 and the second signal modulator 200. At the same time, conductive rubber which is highly elastically deformable, can be favorably attached to the cable, thereby producing the effect of enhancing parameter configuration.

In some embodiments, the first elastic member 510 and the second elastic member 520 which are both elongated structures, can be matched in shape with the first signal modulator 100 and the second signal modulator 200 and in adequate contact with the first signal modulator 100 and the second signal modulator 200. Specifically, the first elastic member 510 and the second elastic member 520 may have a rectangular cross-section.

In other embodiments, the first elastic member 510 and the second elastic member 520 may also be conductive springs, conductive elastic sheets, and the like.

In some embodiments, as shown in FIGS. 1 and 2, the operating member 300 is arranged outside the insulating housing 400, and the operating member 300 is detachably connected to the insulating housing 400. At this time, the operation member 300 may be mounted on the insulating housing 400 after the first signal modulator 100 and the second signal modulator 200 are assembled on the cable, so as to reduce a load during the installation of the first signal modulator 100 or the second signal modulator 200, which makes the assembling simpler and reduces the labor intensity of the operator.

In some embodiments, as shown in FIGS. 1 and 2, the insulating housing 400 has at least two latches 401, and the operating member 300 has slots 301 corresponding to the latches 401. By approaching the operating member 300 to the insulating housing 400 so that the latch 401 is inserted into the slot 301, it is possible to realize a detachable connection between the operating member 300 and the insulating housing 400.

In some embodiments, as shown in FIGS. 1 and 2, the above-described parameter configuration device further includes a third elastic member 530. The third elastic member 530 is made of a conductive material, and the third elastic member 530 is arranged between the two latches 401. When the latch 401 is inserted into the slot 301, the third elastic member 530 is in a compressed state, one end of the third elastic member 530 is in contact with and electrically connected with the operating member 300, and the other end of the third elastic member 530 passes through the insulating housing 400 and is electrically connected with the first signal modulator 100 or the second signal modulator 200. By inserting the latch 401 into the slot 301, it is possible to realize the connection between the operating member 300 and the insulating housing 400. At this time, the third elastic member 530 is in a compressed state so as to be closely attached to the operating member 300. The third elastic member 530 realizes the electrical connection between the connector 300 and the first signal modulator 100 or the second signal modulator 200. At the same time, the third elastic member 530 after compression is prone to rebound to abut against the operating member 300, so as to keep the operating member 300 stable without being easily separated from the insulating housing 400, which is more convenient for an operator to perform parameter configuration.

In some embodiments, the bottom of the side wall of the slot 301 has an assembling groove, and the end of the latch 401 is bent to one side so as to form a bent portion matched with the assembling groove. It is possible to prevent the latch 401 from being separated after insertion into the slot 301, thereby ensuring a stable installation of the operating member 300.

In other embodiments, the insulating housing 400 has a through port, and the first signal modulator 100 or the second signal modulator 200 has a connection groove. The operating member 300 has a plug which passes through the through port and is inserted into the connection groove, thereby realizing the electrical connection between the operating member 300 and the first signal modulator 100 or the second signal modulator 200.

In some embodiments, as shown in FIGS. 1 and 2, one end of the slot 301 extends to one side of the operating member 300 to form a sliding exit. At this time, a force may be applied so that the operating member 300 slides relative to the insulating housing 400, and the sliding direction is a direction of the slot 301, so that the slot can be separated from the sliding exit on one side of the operating member 300, which facilitates that the operating member 300 is removed from the insulating housing 400.

In some embodiments, the first signal modulator 100 is detachably connected to the first part 410. At this time, it is convenient to replace different signal modulators according to different configuration requirements, or to facilitate replacing the first signal modulator 100 after serious wear.

In some embodiments, the second signal modulator 200 is detachably connected to the second part 420. In other embodiments, the first signal modulator 100 may also be fixedly connected with the first part 410, and the second signal modulator 200 may also be fixedly connected with the second part 420.

In some embodiments, as shown in FIGS. 1 and 2, the first signal modulator 100 has a first matching portion 110, and the first part 410 has a second matching portion 411. One of the first matching portion 110 and the second matching portion 411 is a positioning latch, and the other is a positioning slot, such that the positioning latch is clamped to the positioning slot. At this time, it is possible to realize a detachable connection by mating the positioning latch with the positioning slot, which makes the operation simple.

In some embodiments, as shown in FIGS. 1 and 2, there are at least two first matching portions 110 and at least two second matching portions 411, so that the first matching portions 110 correspond to the second matching portions 411, wherein the two first matching portions 110 are arranged on both end surfaces of the first signal modulator 100 respectively. In the above-described structure, when the first part 410 is assembled with the first signal modulator 100, it is possible to visually observe whether the first matching portion 110 and the second matching portion 411 are clamped tightly through both end surfaces of the first signal modulator 100 to ensure that it is impossible to fall off, and at the same time, it is also easier to operate during the detachment.

In some embodiments, the above-described positioning slots may be provided in both end surfaces of the first signal modulator 100, and positioning latches may be provided on both ends of the first part 410. The positioning latch includes a projection for clamping into the positioning slot, so that clamping is realized by clamping the projection into the positioning slot. When the detachment is required, the positioning latch may be raised so that the projection is disengaged from the positioning slot, so as to facilitate removing the first signal modulator 100 from the first part 410.

In other embodiments, a positioning slot may also be provided in the end surface of the first part 410, and a positioning latch may be provided on the end of the first signal modulator 100, so that it is also possible to realize clamping the first part 410 to the first signal modulator 100.

In some embodiments, the second part 420 also cooperates with the second signal modulator 200 in the same manner as the first part 410 with the first signal modulator 100.

In some embodiments, as shown in FIGS. 1 and 2, the second end of the first part 410 has a first latch body 412, and the second end of the second part 420 has a second latch body 421, the first latch body 412 has a limiting slot, and the second latch body 421 is latched into the limiting slot. At this time, the first part 410 and the second part 420 can be fastened in cooperation, so that the first signal modulator 100 and the second signal modulator 200 located within the assembling space can be closely attached to the cable so as to ensure the effect of performing parameter configuration on the terminal, and at the same time, it is easily disassembled to facilitate removing the above-described parameter configuration device from the cable after completing parameter configuration.

In some embodiments, the above-described second latch body 421 may also be provided at the second end of the first part 410, and the above-described first latch body 412 may also be provided at the second end of the second part 420, and it is also possible that the first end of the first part 410 is detachably connected to the first end of the second part 420.

In another embodiment, one end of the first signal modulator 100 is detachably connected to one end of the second signal modulator 200, and the other end of the first signal modulator 100 is detachably connected to the other end of the second signal modulator 200. At this time, the first signal modulator 100 and the second signal modulator 200 may also have a connection state and a separated state, so that the first signal modulator 100 is electrically connected with or separated from the second signal modulator 200.

In some embodiments, as shown in FIGS. 1 and 2, when the first signal modulator 100 and the second signal modulator 200 are in a connection state, the first signal modulator 100 cooperates with the second signal modulator 200 to form a tubular structure. At this time, the first signal modulator 100 and the second signal modulator 200 may have a larger contact area with the cable, so that it possible to better load a configuration signal on the cable through the power line carrier technology, and modify the configuration information of the terminal.

Specifically, the first signal modulator 100, the first elastic member 510, the second signal modulator 200, and the second elastic member 520 are sequentially in contact to form the above-described tubular structure.

In some embodiments, as shown in FIGS. 1 and 2, the operating member 300 has a plurality of buttons 310. The configuration information may be directly input through the button 310, so that it is convenient in operation.

In other embodiments, the operating member 300 has a wireless receiving module, which may be one or at least two of a Bluetooth module, a wireless network module, a mobile cellular network module, and a near-field communication module. It is possible to realize contactless parameter configuration and prevent direct contact with the cables.

In some embodiments, as shown in FIGS. 1 and 2, the operating member 300 is also provided with a display member 320 which may be configured to display the configuration information input by the button 310, so as to facilitate confirming the configuration information and prevent false operation. Specifically, the display member 320 may be a digital tube, a display screen, or the like.

Alternatively, the operating member 300 is internally provided with a battery, which is configured to supply power so that the operating member 300 outputs a parameter configuration current.

Various technical features of the embodiments described above may be combined randomly. For the sake of concise description, all possible combinations of various technical features in the above-described embodiments are not described. However, as long as there is no contradiction between the combinations of these technical features, it should be regarded as the scope recited in this specification.

The embodiments described above only present several embodiments of the present disclosure, and the illustrations thereof are relatively specific and detailed. However, it cannot be thus construed as limiting the scope of the patent for invention. It should be noted that, for those skilled in the art, on the premise of not departing from the concept of the present disclosure, it is also possible to make several modifications and improvements, which all fall into the protection scope of the present disclosure. Accordingly, the protection scope of the present disclosure should be determined by the appended claims.

In the illustrations of the present disclosure, it is to be understood that the terms "center", "longitudinal", "transverse", "length", "width", "thickness", "up", "down", "front", "back", "left", "right", "vertical", "horizontal", "top", "bottom", "inner", "outer", "clockwise", "counterclockwise", "axial", "radial", "circumferential" and other indicated orientations or positional relationships, which are based on the orientations or positional relationships shown in the accompanying drawings, are only intended for facilitating illustrating the present disclosure and simplifying the illustration, rather than indicating or implying that the device or element referred thereto has to present a particular orientation, and be constructed and operated in a particular orientation, and therefore cannot be construed as limiting the present disclosure.

In addition, the terms "first" and "second" are only intended for illustrative purposes, rather than being construed as indicating or implying relative importance or implicitly designating the number of technical features as indicated. Thus, the features delimited with "first" and "second" may explicitly or implicitly include at least one said feature. In the illustrations of the present disclosure, the term "a plurality of" means at least two, for example two and three, unless otherwise explicitly and specifically defined.

In the present disclosure, unless otherwise expressly specified and defined, the terms "mounted", "connected to", "connected" and "fixed" should be understood in a broad sense, for example, fixedly connected or detachably connected, or integrated; mechanically connected or electrically connected; directly connected or indirectly connected through an intermediate medium, or in an interior communication or mutual interaction relationship between two elements, unless otherwise specifically defined. For those of ordinary skill in the art, the specific meanings of the above-described terms in the present disclosure may be understood according to specific conditions.

In the present disclosure, unless otherwise expressly stated and defined, the first feature "above" or "below" the second feature may be the first feature in direct contact with the second feature, or the first feature in indirect contact with the second feature. Moreover, the first feature "upon", "above" and "over" the second feature may be the first features directly above or obliquely above the second feature, or simply means the first feature at a level higher than the second feature. The first feature "underneath", "below" and "under" the second feature may be the first feature directly below or obliquely below the second feature, or simply means the first feature at a level lower than the second feature.

It should be noted that, when an element is referred to as being "fixed to" or "arranged on" another element, it may be directly on the other element or may also be present with an intermediate element. When an element is referred to as being "connected" to another element, it may be directly connected to the other element or might be present with an intermediate element at the same time. The terms "vertical", "horizontal", "up", "down", "left", "right" and similar expressions used herein are only for the purpose of illustration.

What is claimed is:

1. A parameter configuration device, comprising:
   a first signal modulator;
   a second signal modulator; and
   an operating member electrically connected with the first signal modulator or the second signal modulator, wherein the operating member is configured to output a configuration signal current,
   wherein the first signal modulator and the second signal modulator have a connection state and a separated state, such that when the first signal modulator and the second signal modulator are in the connection state, the first signal modulating element is electrically connected with the second signal modulating element, and the first signal modulating element and the second signal modulating element enclose a configuration space for a cable to pass through; and when the first signal modulating element and the second signal modulator are in the separated state, the first signal modulator is separated from the second signal modulator.

2. The parameter configuration device according to claim 1, further comprising:
   an insulating housing comprising a first part and a second part,
   wherein a first end of the first part is rotatably connected with a first end of the second part, and a second end of the first part is detachably connected to a second end of the second part, the first part and the second part enclose an assembling space, the first signal modulator and the second signal modulator are both arranged within the assembling space, the first signal modulator is arranged on the first part, and the second signal modulator is arranged on the second part.

3. The parameter configuration device according to claim 2, further comprising:
   a first elastic member and a second elastic member, wherein the first elastic member and the second elastic member are both of a conductive material,
   wherein when the first signal modulator and the second signal modulator are in the connection state, the first signal modulator and the second signal modulator are arranged at intervals, the first elastic member is arranged between one side of the first signal modulator and one side of the second signal modulator, the first elastic member is in contact with the first signal modulator and the second signal modulator respectively, the second elastic member is arranged between the other side of the first signal modulator and the other side of the second signal modulator, the second elastic member is in contact with the first signal modulator and the second signal modulator respectively.

4. The parameter configuration device according to claim 2, wherein the insulating housing further comprises:
   a connector located between the first end of the first part and the first end of the second part,
   wherein both sides of the connector are rotatably connected with the first end of the first part and the first end of the second part respectively, and a thickness of the connector is smaller than a thickness of the first part and a thickness of the second part.

5. The parameter configuration device according to claim 3, wherein the first elastic member and the second elastic member are both of conductive rubber.

6. The parameter configuration device according to claim 2, wherein the operating member is arranged outside the insulating housing, and the operating member is detachably connected to the insulating housing.

7. The parameter configuration device according to claim 6, wherein the insulating housing has at least two latches, and the operating member has slots corresponding to the latches.

8. The parameter configuration device according to claim 7, further comprising:
   a third elastic member made of a conductive material, wherein the third elastic member is arranged between two of the at least two latches,
   wherein when the latch is inserted into the slot, the third elastic member is in a compressed state, one end of the third elastic member is configured to be in contact with and electrically connected with the operating member, and the other end of the third elastic member passes through the insulating housing and is electrically connected with the first signal modulator or the second signal modulator.

9. The parameter configuration device according to claim 7, wherein one end of the slot extends to a side of the operating member to form a sliding exit.

10. The parameter configuration device according to claim 2, wherein the first signal modulator is detachably connected to the first part.

11. The parameter configuration device according to claim 10, wherein the first signal modulator has a first matching portion, the first part has a second matching portion, one of the first matching portion and the second matching portion is a positioning latch, and the other is a positioning slot, and the positioning latch is clamped with the positioning slot.

12. The parameter configuration device according to claim 11, wherein the numbers of the first matching portion and the second matching portion are both at least two, and the first matching portion corresponds to the second matching portion, wherein two first matching portions are arranged on both end surfaces of the first signal modulator respectively.

13. The parameter configuration device according to claim 2, wherein a second end of the first part has a first latch body, a second end of the second part has a second latch body, the first latch body has a limiting slot, and the second latch body latches into the limiting slot.

14. The parameter configuration device according to claim 1, wherein one end of the first signal modulator is detachably connected to one end of the second signal modulator, and the other end of the first signal modulator is detachably connected to the other end of the second signal modulator.

15. The parameter configuration device according to claim 1, wherein when the first signal modulator and the second signal modulator are in the connection state, the first signal modulator and the second signal modulator cooperate to form a tubular structure.

16. The parameter configuration device according to claim 1, wherein the operating member has a plurality of buttons.

\* \* \* \* \*